A. K. SCHAAP.
PISTON RING AND MOUNTING THEREFOR.
APPLICATION FILED JUNE 26, 1918.
1,357,729. Patented Nov. 2, 1920.
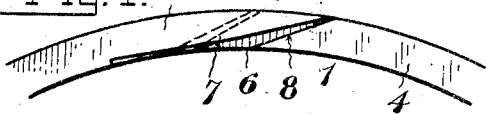
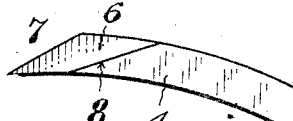
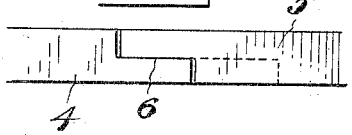
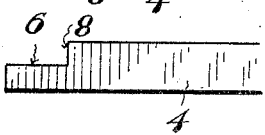
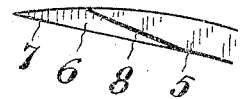
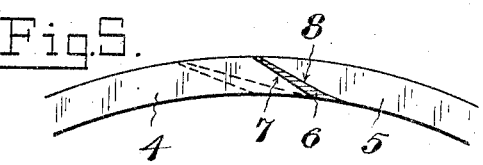
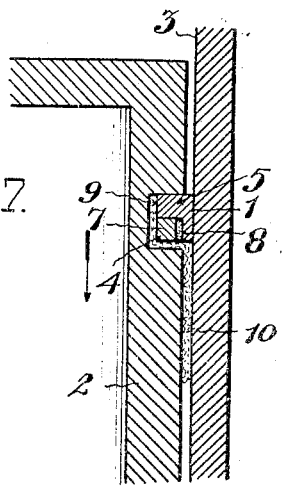
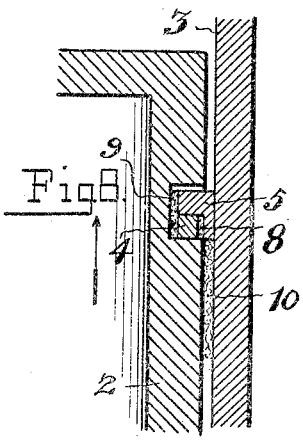
Inventor
Alexander K. Schaap
By his Attorney

UNITED STATES PATENT OFFICE.

ALEXANDER K. SCHAAP, OF NEW YORK, N. Y., ASSIGNOR TO EVA C. SCHAAP, OF BROOKLYN, NEW YORK.

PISTON-RING AND MOUNTING THEREFOR.

1,357,729.

Specification of Letters Patent. Patented Nov. 2, 1920.

Application filed June 26, 1918. Serial No. 242,016.

*To all whom it may concern:*

Be it known that I, ALEXANDER K. SCHAAP, a citizen of the United States, and a resident of the city of New York, county of Kings, and State of New York, have invented a new and useful Improvement in Piston-Rings and Mountings Therefor, of which the following is a specification.

The object of my invention is to provide a device of this class in which a novel form of piston ring is mounted in a new way so as to insure a tight joint under all conditions of service and thereby prevent any leakage of lubricating oil into the combustion chamber at any time even though the crank case be supplied with more than its normal supply.

This and other objects are accomplished by my invention, one embodiment of which is hereinafter set forth.

For a more particular description of my invention reference is to be had to the accompanying drawings, in which—

Figure 1 is a plan view of one side of the joint of my improved ring.

Fig. 2 shows one end of this ring, the end at the right of Fig. 1.

Fig. 3 shows one end looking outwardly, the view being taken at right angles to that of Fig. 2.

Fig. 4 is a side elevation of the exterior of the joint.

Fig. 5 is an inverse plan view and shows the opposite side from that shown in Fig. 1.

Fig. 6 shows the end at the right of Fig. 5.

Figs. 7 and 8 are sectional views taken through my improved ring and a cylinder and piston so as to show the operation of the ring. Fig. 7 showing how a liquid seal is formed on the down stroke of the piston and Fig. 8 shows how the seal acts on the up stroke.

Throughout the various views of the drawings, similar reference characters designate similar parts.

My improved ring 1 is placed in a piston 2 and rubs against the cylinder wall 3 which is never perfectly regular but may be as nearly so as such structures can be made by grinding or otherwise.

The ring 1 is a one piece ring with two coöperating ends 4 and 5. Each end has a flat surface 6 adapted to engage a corresponding surface on the other end and two off set beveled edges 7 and 8 at right angles to the surface 6 which are so arranged that a surface 7 is close to a surface 8 on the other end. These surfaces are made so as to be closest at the outer surface of the ring and diverge slightly toward the interior of the ring. It will be noted that these beveled surfaces are set at different angles in the respective ends in the embodiment shown, but this is not essential.

When the ring 1 is in place in a groove 9 of the piston 2, lubricating oil 10 is splashed between the cylinder and piston in the conventional way but does not get by the piston ring 1 in any undesirable amount because as this piston rises and falls, the cylinder walls are rubbed by the ring which must expand and contract to a limited extent because of irregularities in the cylinder wall. This expansion and contraction causes a corresponding separation and approaching of the surfaces 7 and 8 which are never separated enough to overcome the capillary action of the lubricating oil 10 which is between them. But, as these surfaces diverge, oil is first sucked as the oil passes inwardly from the cylinder wall and then passed in from the cylinder wall and then passed inwardly to the back of the ring 1 where it accumulates and reinforces the ring so as to hold it against the cylinder wall and keeps the piston away from the wall. The excess oil escapes on the down or suction stroke when the ring is against the upper edge of the groove as shown in Fig. 7. On the compression stroke this ring is at the bottom of the groove but the pressure on top keeps the oil down so none escapes. The internal pressure of the oil is not sufficient at any time to overcome the capillary action and force the oil outwardly between the converging surfaces 7 and 8 and these surfaces and the surfaces 6 force this oil inwardly while maintaing a tight joint.

In view of the foregoing, it is apparent that a tight joint is maintained at all times between the ends 4 and 5 with a liquid seal always present between the surfaces 7 and 8 when the device is in use, and the ring 1 is always snug against the cylinder wall 3 with a tight, sliding fit.

While I have shown one embodiment of my invention, it is obvious that it is not restricted thereto but is broad enough to cover all structures that come within the scope of the annexed claims.

What I claim is—

1. In a device of the class described, a piston, a cylinder wall, and a packing ring with ends converging as the exterior surface is approached and a liquid seal between the piston ring and piston which is maintained by the pressure exerted by the converging ends of the ring, whereby a tight joint between the piston and cylinder exists at all times.

2. A piston ring having ends with overlapping and converging surfaces which extend continuously and diagonally from the outer to the inner surfaces of the ring with the opening wider at the interior than at the exterior so that when the ring is in use liquid will be forced from the exterior to the interior of the ring.

3. In a device of the class described, a piston with a groove therein, a cylinder and a piston ring loosely mounted in said groove, with means for holding a liquid seal between its ends and forcing liquid between the piston and piston ring whereby a liquid tight joint between the piston and cylinder is preserved at all times.

4. A piston ring with offset converging surfaces which extend continuously and diagonally from the outer to the inner surfaces of the ring with larger openings at the interior than at the exterior so that when the ring is in use, oil will be forced from the exterior to the interior of the ring.

5. A single piece ring having coöperating ends each of which has three continuous and coöperating surfaces, one pair of coöperating surfaces lying substantially in the median plane of the ring, and the other two coöperating surfaces of each end being beveled at different angles so that the opening will be wider at the interior than at the exterior whereby oil is forced from the exterior to the interior of the ring when the ring is in use.

ALEXANDER K. SCHAAP.